United States Patent
Merriken et al.

(10) Patent No.: US 12,436,343 B2
(45) Date of Patent: Oct. 7, 2025

(54) MULTI-FIBER FERRULE END FACE FEATURES AND CORRESPONDING METHODS THEREOF

(71) Applicant: CORNING RESEARCH & DEVELOPMENT CORPORATION, Corning, NY (US)

(72) Inventors: James Ronald Merriken, Granite Falls, NC (US); Charles Gregory Stroup, Lincolnton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 322 days.

(21) Appl. No.: 18/167,111

(22) Filed: Feb. 10, 2023

(65) Prior Publication Data

US 2023/0258879 A1 Aug. 17, 2023

Related U.S. Application Data

(60) Provisional application No. 63/310,792, filed on Feb. 16, 2022.

(51) Int. Cl.
  *G02B 6/38* (2006.01)
(52) U.S. Cl.
  CPC ........ *G02B 6/3885* (2013.01); *G02B 6/3833* (2013.01); *G02B 6/3855* (2013.01); *G02B 6/3863* (2013.01)
(58) Field of Classification Search
  CPC .. G02B 6/3885; G02B 6/3833; G02B 6/3855; G02B 6/3863
  See application file for complete search history.

(56) References Cited

U.S. PATENT DOCUMENTS

| | | | | |
|---|---|---|---|---|
| 4,510,005 A | * | 4/1985 | Nijman | B29C 65/245 156/499 |
| 5,214,730 A | * | 5/1993 | Nagasawa | G02B 6/389 385/71 |
| 5,421,928 A | * | 6/1995 | Knecht | B24B 19/226 156/267 |
| 5,867,621 A | * | 2/1999 | Luther | G02B 6/3825 385/59 |
| 5,917,975 A | * | 6/1999 | Bloom | G02B 6/2835 385/60 |
| 6,416,236 B1 | * | 7/2002 | Childers | G02B 6/3835 385/84 |
| H2141 H | * | 1/2006 | Kevern | 385/55 |
| 7,267,491 B2 | | 9/2007 | Luther et al. | |
| 8,573,856 B2 | | 11/2013 | Webb et al. | |

(Continued)

FOREIGN PATENT DOCUMENTS

| | | |
|---|---|---|
| JP | 10-048468 A | 2/1998 |
| WO | 2002/082142 A1 | 10/2002 |
| WO | 2019/199737 A1 | 10/2019 |

*Primary Examiner* — Michael Stahl
(74) *Attorney, Agent, or Firm* — Kapil U. Banakar

(57) ABSTRACT

The present disclosure relates to a multi-fiber optical ferrule that includes a protrusion on the ferrule end face that surrounds and encompasses ferrule microholes on the ferrule end face. The protrusion is shaped and is deformable upon contact with a contact target such that alignment of optical fibers within the ferrule can be controlled. Stated another way, the protrusion enables precision control of the fiber position relative to the ferrule end face.

20 Claims, 6 Drawing Sheets

(56) References Cited

U.S. PATENT DOCUMENTS

| | | | |
|---|---|---|---|
| 8,696,215 B1 | 4/2014 | Fewkes et al. | |
| 8,702,322 B1 | 4/2014 | Danley et al. | |
| 9,568,686 B2 | 2/2017 | Fewkes et al. | |
| 9,880,362 B2 | 1/2018 | Danley et al. | |
| D810,027 S | 2/2018 | De Jong et al. | |
| 9,989,710 B2 | 6/2018 | Dejong et al. | |
| 2004/0120654 A1 | 6/2004 | Kevern | |
| 2005/0249465 A1 | 11/2005 | Kevern et al. | |
| 2013/0097843 A1* | 4/2013 | Diao | G02B 6/3855 29/447 |
| 2013/0156381 A1* | 6/2013 | Kadar-Kallen | G02B 6/325 264/1.25 |
| 2013/0343709 A1 | 12/2013 | Danley et al. | |
| 2015/0378108 A1* | 12/2015 | Kuznia | G02B 6/3847 156/60 |
| 2016/0054523 A1* | 2/2016 | Lu | G02B 6/3863 264/1.25 |
| 2017/0059789 A1* | 3/2017 | Chiota | G02B 6/3885 |
| 2017/0184800 A1* | 6/2017 | de Jong | G02B 6/3825 |
| 2017/0192180 A1 | 7/2017 | Andrus et al. | |
| 2018/0329156 A1* | 11/2018 | Flaig | H01J 37/32009 |
| 2019/0384024 A1* | 12/2019 | Neukirch | G02B 6/423 |
| 2022/0137303 A1* | 5/2022 | Otomitsu | G02B 6/3818 385/78 |
| 2023/0049598 A1 | 2/2023 | Cheng | |
| 2023/0092201 A1* | 3/2023 | Lu | G02B 6/3847 |
| 2023/0384530 A1* | 11/2023 | Hirose | G02B 6/3826 |

\* cited by examiner

MULTI-FIBER FERRULE END FACE FEATURES AND CORRESPONDING METHODS THEREOF

PRIORITY APPLICATION

This application claims the benefit of priority of U.S. Provisional Application No. 63/310,792, filed on Feb. 16, 2022, the content of which is relied upon and incorporated herein by reference in its entirety.

FIELD OF THE DISCLOSURE

This disclosure relates to a multi-fiber ferrule that is suitable for both single mode and multi-mode optical fiber applications and more particularly, to a multi-fiber ferrule and ferrule end face configuration suitable for both single mode and multi-mode optical fiber applications.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Typical multi fiber ferrules (e.g., MPO connectors) have multiple fiber microholes and guide pin bores. Terminating the ferrules includes inserting optical fibers into the multi-fiber ferrules along an axis parallel to the fiber microholes. Termination also includes adhering the inserted optical fibers into the ferrule bores. In some instances, epoxy is placed into the ferrule before inserting the optical fibers as an additional processing step, and the insertion of the optical fibers through the ferrule bores results in beads of the epoxy on an end face of the ferrule after such insertion.

After fibers are inserted into the ferrules, fibers may undergo an additional processing step—polishing, which can be done for various purposes (e.g., to meet certain geometric parameters, industry specifications, and/or customer requirements).

In some instances, controlling the amount of insertion of optical fibers into multi-fiber ferrules along an axis parallel to the fiber microholes is a technique by which polishing can be minimized or eliminated. However, in this instance, the shape/profile of the multi-fiber ferrule can limit the high precision insertion of optical fibers due to challenges associated with fast active fiber position measurement during insertion and the difficultly of effectively aligning the end face of the ferrule with a high-precision optical flat to serve as a fiber insertion hard-stop.

Improvements in the foregoing are desired so that additional polishing steps can be bypassed.

SUMMARY OF THE DISCLOSURE

The present disclosure relates to a multi-fiber optical ferrule that includes a protrusion on the ferrule end face that surrounds and encompasses ferrule microholes on the ferrule end face. The protrusion is shaped and is deformable upon contact with a contact target such that alignment of optical fibers within the ferrule can be controlled. Stated another way, the protrusion enables precision control of the fiber position relative to the ferrule end face.

In one embodiment, a multi-fiber optical ferrule assembly is provided. The multi-fiber optical ferrule assembly comprising: a ferrule body comprising a top surface, a bottom surface, a pair of opposing edge surfaces, a rear portion, and an end face; the ferrule body including a plurality of microholes configured to receive a plurality of optical fibers, wherein the plurality of microholes extend through the ferrule body from the rear portion to the end face; the end face including a protrusion extending from the end face, wherein the protrusion covers the plurality of microholes on the end face; wherein the protrusion has a maximum height ranging between 10 microns and 5000 microns from the end face to an outer edge of the protrusion.

In another embodiment, the protrusion has a shape of at least one of biparabolic, cylindrical, and chamfered shapes. In another embodiment, the plurality of optical fibers are inserted through the ferrule body and into the protrusion, wherein each of the plurality of optical fibers include an end face that contacts the outer edge of the protrusion. In another embodiment, the plurality of optical fibers have a protrusion height ranging between 0.5 microns and 20 microns relative to the end face. In another embodiment, the protrusion is deformable when contacted by a contact target. In another embodiment, the plurality of optical fibers are secured within the ferrule body by an interference fit such that the plurality of optical fiber withstand a pull-out force of at least 2 pounds-force (lbf). In another embodiment, the optical fiber connector assembly has an insertion loss of less than 0.5 decibels (dB) at a reference wavelength between 850 nanometers (nm) and 1300 nm. In another embodiment, the optical fiber connector assembly has an insertion loss of less than 0.35 dB at a reference wavelength between 1310 nm and 1625 nm.

In one embodiment, a method of assembling an optical fiber assembly by terminating a plurality of optical fibers within a ferrule, wherein the ferrule comprises: a ferrule body comprising a top surface, a bottom surface, a pair of opposing edge surfaces, a rear portion, and an end face, the ferrule body including a plurality of microholes extending through the ferrule body from the rear portion to the end face and configured to receive a plurality of optical fibers, and the end face including a protrusion applied onto and extending from the end face, wherein the protrusion is applied over the plurality of microholes on the end face is provided. The method comprising: heating the ferrule such that the plurality of microholes expand; moving the ferrule such that the protrusion contacts a contact target, wherein an outer edge of the protrusion deforms; inserting at least one optical fiber into at least one microhole of the plurality of microholes such that an end face of the at least one optical fiber is in contact with the contact target; and cooling the ferrule such that the plurality of microholes contract to create an interference fit and the length of the ferrule contracts relative to the position of the fiber to create well controlled fiber protrusion relative to the ferrule end face and at least one optical fiber of the plurality of optical fibers expand to create a fiber protrusion relative to the end face of the ferrule body.

In another embodiment, the fiber has a fiber protrusion height ranging between 0.5 microns and 20 microns from the end face of the ferrule body. In another embodiment, the protrusion has a height ranging between 10 microns and 5000 microns from the end face to an outer edge of the protrusion. In another embodiment, the protrusion has a shape of at least one of biparabolic, cylindrical, and chamfered shapes. In another embodiment, the inserting step further comprises: inserting the plurality of optical fibers through the ferrule body and into the protrusion, wherein each end face of the plurality of optical fibers contact the outer edge of the protrusion. In another embodiment, the plurality of optical fibers are secured within the ferrule body by an interference fit such that the plurality of optical fiber withstand a pull-out force of at least 2 pounds-force (lbf). In another embodiment, the optical fiber assembly has an insertion loss of less than 0.5 decibels (dB) at a reference wavelength between 850 nanometers (nm) and 1300 nm. In another embodiment, the optical fiber assembly has an insertion loss of less than 0.35 dB at a reference wavelength between 1310 nm and 1625 nm.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to a multi-fiber optical ferrule that includes a protrusion on the ferrule end face that surrounds and encompasses ferrule microholes on the ferrule end face. The protrusion is shaped and is deformable upon contact with a contact target such that alignment of optical fibers within the ferrule can be controlled. Stated another way, the protrusion enables precision control of the fiber position relative to the ferrule end face.

Figure 1:
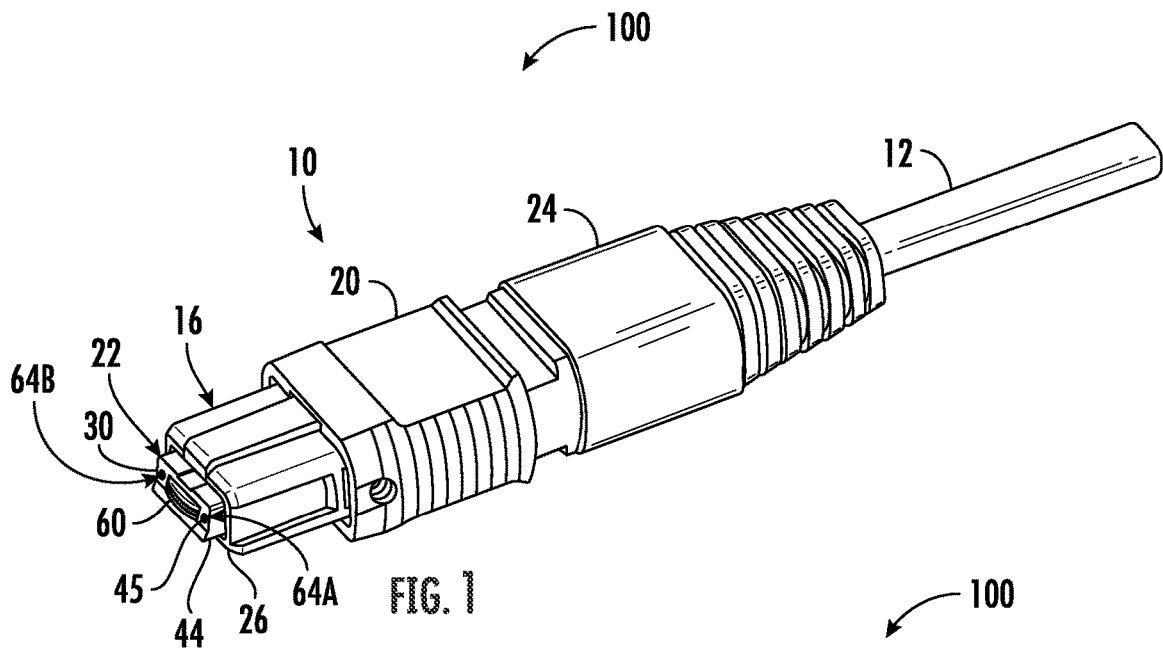
FIG. 1 is a perspective view of a fiber optic connector and an associated fiber optic cable forming a fiber optic cable assembly.
Figure 1A:
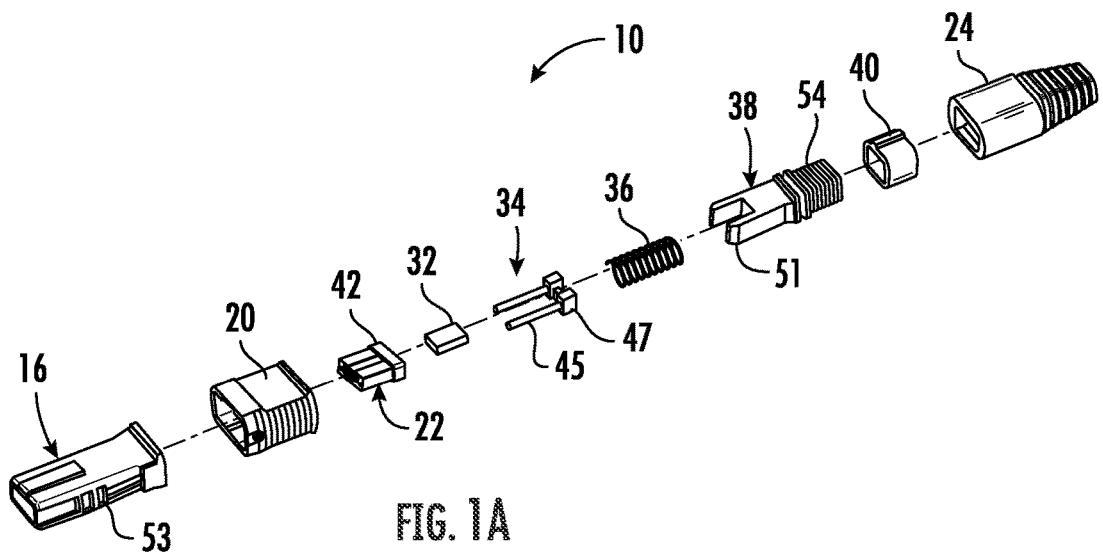
FIG. 1A is an exploded perspective view of the fiber optic cable assembly of FIG. 1.

Referring first to FIG. 1, an example of a fiber optic connector 10 (also referred to as "optical connector 10", or simply "connector 10") is shown in FIG. 1, with an exploded view of the connector being provided in FIG. 1A. The connector 10 is shown in the form of a multi-fiber push-on/pull-off (MPO) connector (e.g., according to IEC 61754-7-2: 2019 or TIA/EIA 604-5-F: 2019).

Before discussing multi-fiber ferrule embodiments and corresponding methods associated with the ferrule herein, a brief overview of the connector 10 shown in FIGS. 1 and 1A will be provided to facilitate discussion, as the multi-fiber ferrules and other components shown in subsequent figures may be used with the same type of connector as the connector 10. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 100. The connector 10 includes a ferrule 22, a housing 16 received over the ferrule 22, a slider 20 received over the housing 16, and a boot 24 received over the cable 12. The ferrule 22 is spring-biased within the housing 16 so that a front portion 44 of the ferrule 22 extends beyond a front end 26 of the housing 16. Optical fibers (not shown) carried by the cable 12 extend through bores 60 (also referred to as micro-holes or micro-bores) defined in the ferrule 22 before terminating at or near a front end face or ferrule end face 62 of the ferrule 22. The optical fibers are secured within the ferrule 22 using an adhesive material (e.g., epoxy) and can be presented for optical coupling with optical fibers of a mating component (e.g., another fiber optic connector; not shown) when the housing 16 is inserted into an adapter, receptacle, or the like.

As shown in FIG. 1A, the connector 10 also includes a ferrule boot 32, guide pin assembly 34, spring 36, crimp body 38, and crimp ring 40. The ferrule boot 32, which is symmetrical and substantially rectangular in shape along each surface thereof, is received in a rear portion 42 of the ferrule 22 to help support the optical fibers 18 (FIG. 3A) extending to the micro-holes or bores 60 (shown in FIG. 1). In particular, optical fibers 18 (FIG. 3A) extend through an aperture (not shown) defined through the ferrule boot 32. The guide pin assembly 34 includes a pair of guide pins 45 extending from a pin keeper 47. Features on the pin keeper 47 cooperate with features on the guide pins 45 to retain portions of the guide pins 45 within the pin keeper 47. When the connector 10 is assembled, the pin keeper 47 is positioned against a back surface of the ferrule 22, and the guide pins 45 extend through pin holes 64A, 64B (shown in FIG. 1) provided in the ferrule 22 so as to project beyond the ferrule end face 62 of the ferrule 22.

Both the ferrule 22 and guide pin assembly 34 are biased to a forward position relative to the housing 16 by the spring 36. More specifically, the spring 36 is positioned between the pin keeper 47 and a portion of the crimp body 38. The crimp body 38 is inserted into the housing 16 when the connector 10 is assembled and includes latching arms 51 that engage recesses 53 in the housing 16. The spring 36 is compressed by this point and exerts a biasing force on the ferrule 22 via the pin keeper 47. The rear portion 42 of the ferrule 22 defines a flange that interacts with a shoulder or stop formed within the housing 16 to retain the rear portion 42 of the ferrule 22 within the housing 16. The rear portion 42 of the ferrule 22 also includes a cavity (not shown) configured to receive at least a front portion of the ferrule boot 32.

In a manner not shown in the figures, aramid yarn or other strength members from the cable 12 are positioned over an end portion 54 of the crimp body 38 that projects rearwardly from the housing 16. The aramid yarn is secured to the end portion 54 by the crimp ring 40, which is slid over the end portion 54 and deformed after positioning the aramid yarn. The boot 24 covers this region, as shown in FIG. 1, and provides strain relief for optical fibers emanating from the fiber optic cable 12 by limiting the extent to which the connector 10 can bend relative to the fiber optic cable 12.

Now that a general overview of the connector 10 has been provided, alternative ferrule designs will be described. Although the ferrule 22 includes a surface embodying a flat ferrule end face 62, in certain embodiments, one or more portions of the ferrule end face 62 may protrude forwardly from such a surface to form one or more pedestals through which multiple bores (such as bores 60 shown in FIG. 1) extend. Similarly, although the ferrule end face 62 of the ferrule 22 shown in FIG. 1 includes multiple bores 60 that are equally spaced to form a one-dimensional array, in certain embodiments, multiple groups of bores may extend through a front end face with one or more solid regions free of bores provided between such groups of bores. For example, a ferrule configured for parallel optics applications for 40 Gps, 100 Gps, or higher transmission may include first and second groups of four micro-holes or bores that are spaced apart (e.g., by a distance equal to four bores) and that each receive a different group of four optical fibers, with a solid region free of bores provided between the groups of bores along a front end face of the ferrule. A ferrule having such a configuration would be particular suited for parallel optics applications with four transmit optical fibers and four receive optical fibers (relative to a ferrule including twelve bores in which only the first four and the last bores include terminated optical fibers) in that there would be no unused optical fibers or empty bores.

Figure 2:
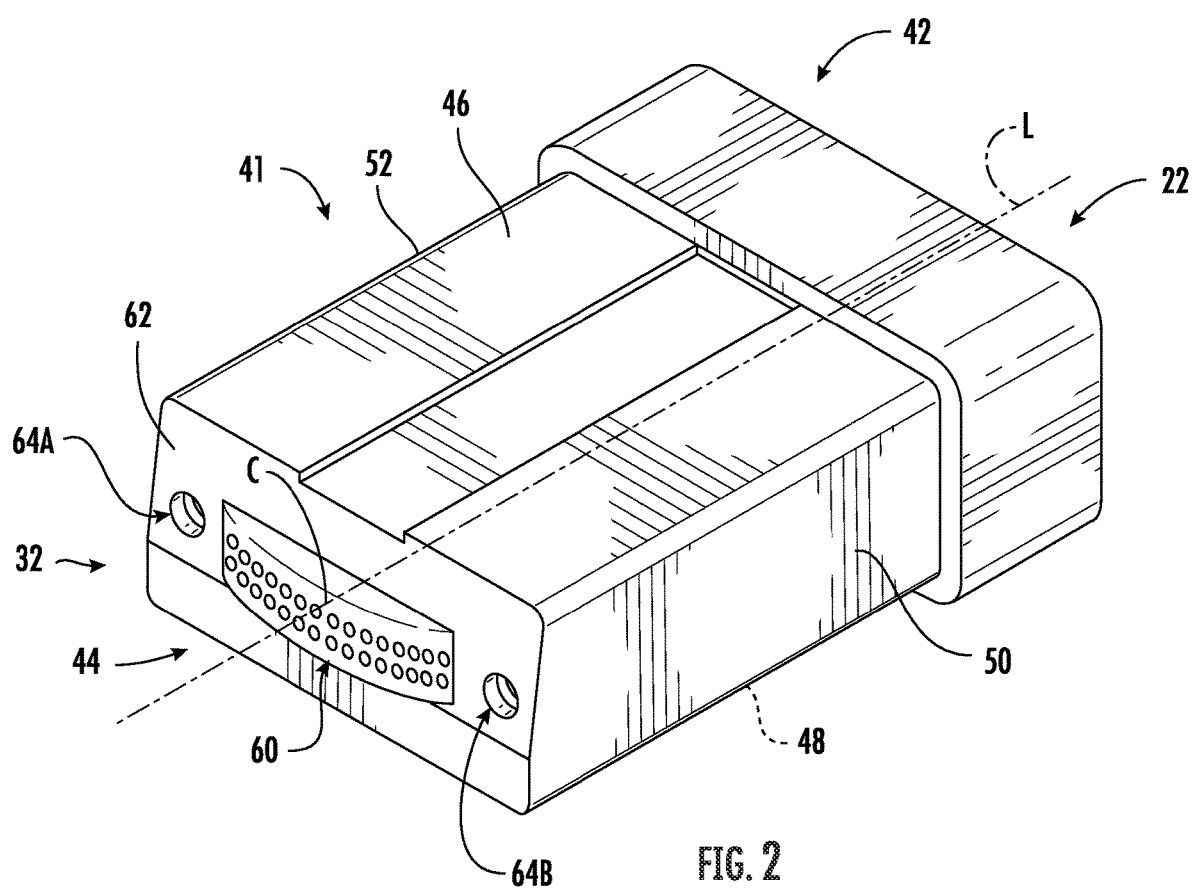
FIG. 2 is a perspective view of a multi-fiber ferrule of the fiber optic cable assembly of FIG. 1.

FIG. 2 illustrates a ferrule 22 in accordance with an exemplary embodiment of the disclosure. The ferrule 22 includes a generally rectangular body or ferrule body 41 having a rear portion 42, a front portion 44, a top wall 46, bottom wall 48, and generally parallel side walls 50, 52. It should be recognized that while the ferrule 22 is described as having a generally rectangular configuration, aspects of the invention are not limited to such an arrangement. More particularly, ferrule 22 may have a wide range of shapes and sizes and remain within the scope of the present disclosure. The terms "rear" and "forward" refer to positions relative to the main fiber optic cable 12, with "rear" being located closer to the main fiber optic cable 12 than "forward". In some embodiments, the rear portion 42 of the ferrule 22 includes an opening for accessing an internal cavity or ferrule bores of the ferrule 22. The ferrule bores are configured to receive the optical fibers 18 (FIG. 3A) carried by the fiber optic cable 12. The ferrule bores lead to the front portion 44 where a plurality of micro-bores 60 are defined on ferrule end face 62, and each microhole 60 is configured to receive a respective optical fiber 18 from the fiber optic cable 12. The optical fibers 18 may be part of an optical fiber ribbon (groups of optical fibers held together with a common matrix material) or "loose" optical fibers (i.e., not held together with other optical fibers). In some embodiments, micro-bores 60 are oriented in a multiple row configuration as shown. However, it is within the scope of the present disclosure that in alternate embodiments, micro-bores 60 can be in an alternate configuration (e.g., single row).

In general, ferrule 22 includes a ferrule end face 62 that includes a pair of alignment pin holes 64A, 64B that can receive precision diameter guide pins 45 and are positioned on opposite sides of micro-bores 60 over which protrusion 66 is positioned. In some embodiments, ferrule 22 is designed to be hermaphroditic where pin hole 64A includes a guide pin and pin hole 64B is a recess configured to receive a guide pin on another connector. However, it is within the scope of the present disclosure that alternate configurations of pin holes 64A, 64B may be used. In some embodiments, ferrule end face 62 is angled (relative to a vertical axis B1 that is perpendicular to longitudinal axis L, which is parallel to the axes of microholes 60 along a z axis of a Cartesian coordinate system shown in at least FIG. 3C) so that it can mate with another ferrule 22 if the other ferrule 22 is rotated 180 degrees about a longitudinal axis L that extends parallel to the fiber array from center C. In some embodiments, ferrule end face 62 has at least a portion 62' of end face 62 that has an angle relative to longitudinal axis L ranging between 0° and 10°, between 0° and 9.5°, or between 0° and 8°. In some embodiments, ferrule end face 62 is angled relative to vertical axis B1 (FIG. 3C) at an angle of about 8°.

Figure 3A:
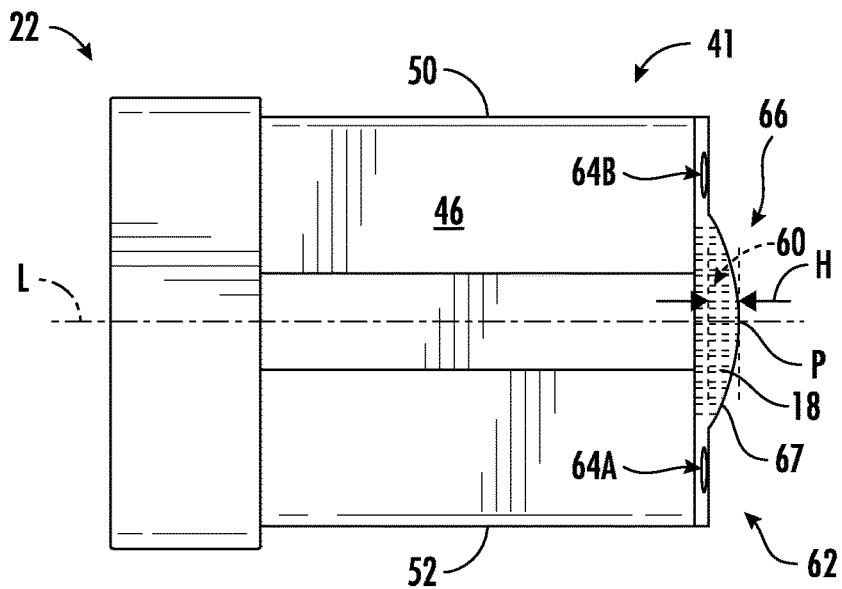
FIGS. 3A-3C are top, front, and side views, respectively, of the multi-fiber ferrule of FIG. 2.
Figure 3B:
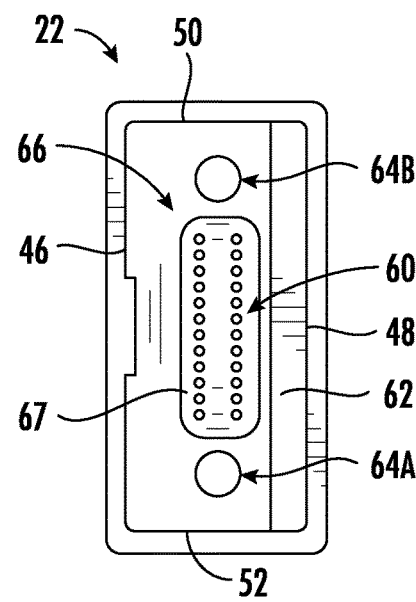
Figure 3C:
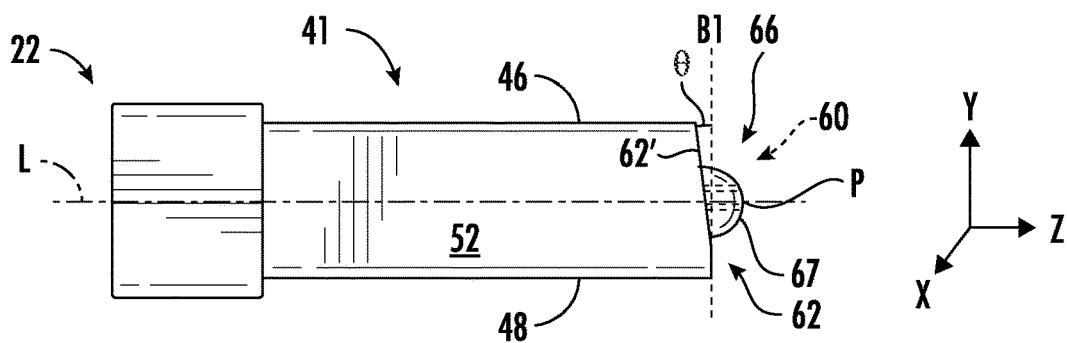

As shown in FIG. 2 and with reference to FIGS. 3A-3C, ferrule end face 62A includes a protrusion 66. In some embodiments, protrusion 66 is integrally formed with ferrule end face 62. That is, ferrule 22 is molded such that protrusion 66 is formed onto ferrule 22 (i.e., integrally formed with ferrule 22). In some embodiments, protrusion 66 is separately molded and applied onto ferrule end face 62. Protrusion 66 is made of the same materials of ferrule 22. However, it is within the scope of the present disclosure that alternate suitable materials of ferrule 22 may also be used for protrusion 66. In addition, protrusion 66 has a modulus of elasticity such that protrusion 66 is deformable when a force is applied onto it.

As shown, protrusion 66 is applied onto ferrule end face 62 such that protrusion 66 covers or encases microholes 60. In general, protrusion 66 of ferrule end face 62 comprise between less than 1% and 50%, between less than 1% and 40%, or between less than 1% and 30% of a surface area of ferrule end face 62. Protrusion 66 has a geometry designed for the purpose of precision fiber insertion as described herein. In some embodiments, protrusion 66 is shown to have a biparabolic shape. However, it is within the scope of the present disclosure that in alternate embodiments, alternate suitable shapes may be used for protrusion 66, such as cylindrical or chamfered, for example. As used herein, "biparabolic" refers to a shape in which the cross section of the shape is a parabola and the shape has two different curvatures in two different axis planes (e.g., one curvature in the xy plane of a Cartesian coordinate system and another curvature in the yz plane of a Cartesian coordinate system).

Figure 4A:
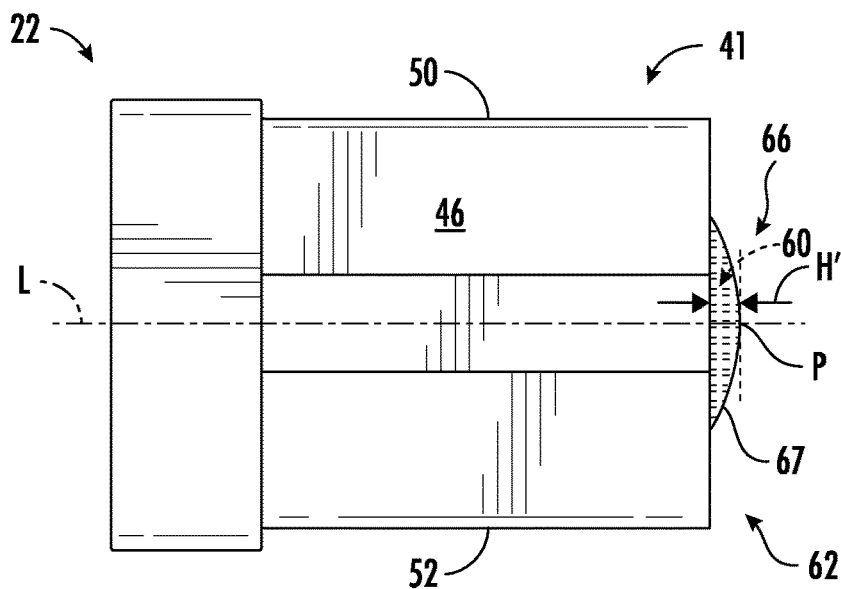
FIGS. 4A-4C are top, front, and side views, respectively, an alternate embodiment of the multi-fiber ferrule of FIG. 2.
Figure 4B:
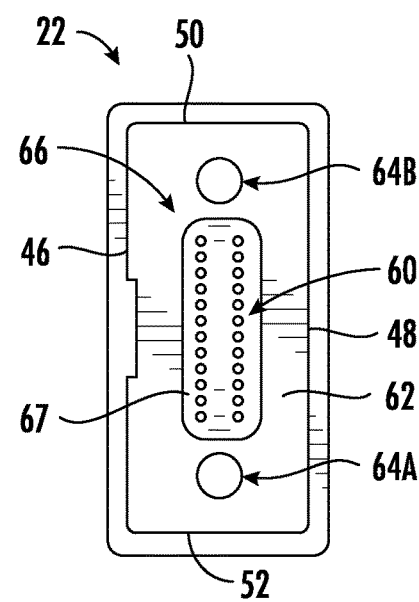
Figure 4C:
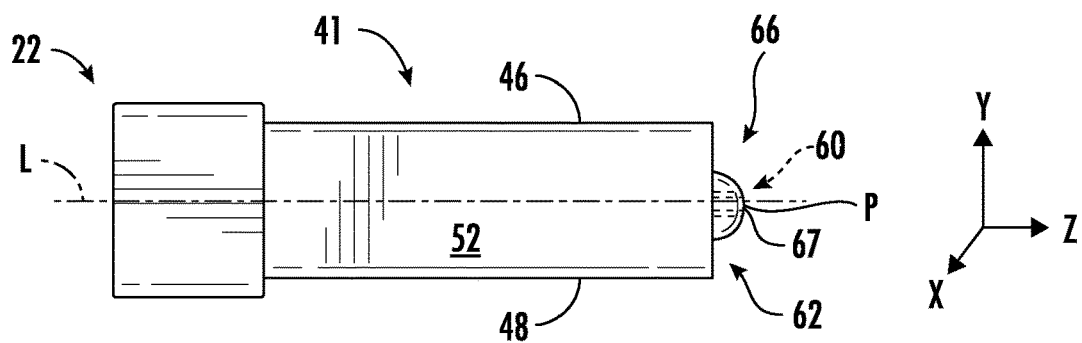

As mentioned previously, protrusion 66 is included on ferrule end face 62 and extends from ferrule end face 62. In particular, protrusion 66 extends from ferrule end face 62 at a maximum height H (FIG. 3A). Stated another way, protrusion 66 has a shape defined by an outer edge 67 of protrusion 66 such that protrusion extends from ferrule end face 62 at a maximum height H from ferrule end face 62 to outer edge 67 to define an apex point P, where a contact target 68 (FIG. 5; discussed below) can contact protrusion 66. In some embodiments, protrusion 66 has a maximum height H ranging between 10 microns and 5000 microns, or between 10 microns and 2000 microns. As shown in FIG. 3C, protrusion 66 is applied onto an angled surface 62' of ferrule end face 62. In some embodiments, as mentioned previously, angled surface 62' has an angle relative to vertical axis B1 of ferrule 22 ranging 0° and 10°, between 0° and 9.5°, or between 0° and 8°. In some embodiments, ferrule end face 62 is angled relative to vertical axis B1 (FIG. 3C) at an angle of about 8°. It is within the scope of the present disclosure that in alternate embodiments, protrusion 66 can be applied onto ferrule end face 62 where there is no angled surface 62' (i.e., ferrule end face 62 is perpendicular to bottom surface wall 48 of ferrule 22 as shown in FIGS. 4A-4C where the above description relating to protrusion 66 is the same excluding angled surface 62'). For the sake of brevity, discussion of protrusion 66 in the context of FIGS. 4A-4C is omitted, and reference can be made to the disclosure relating to FIGS. 3A-3C.

Figure 5:
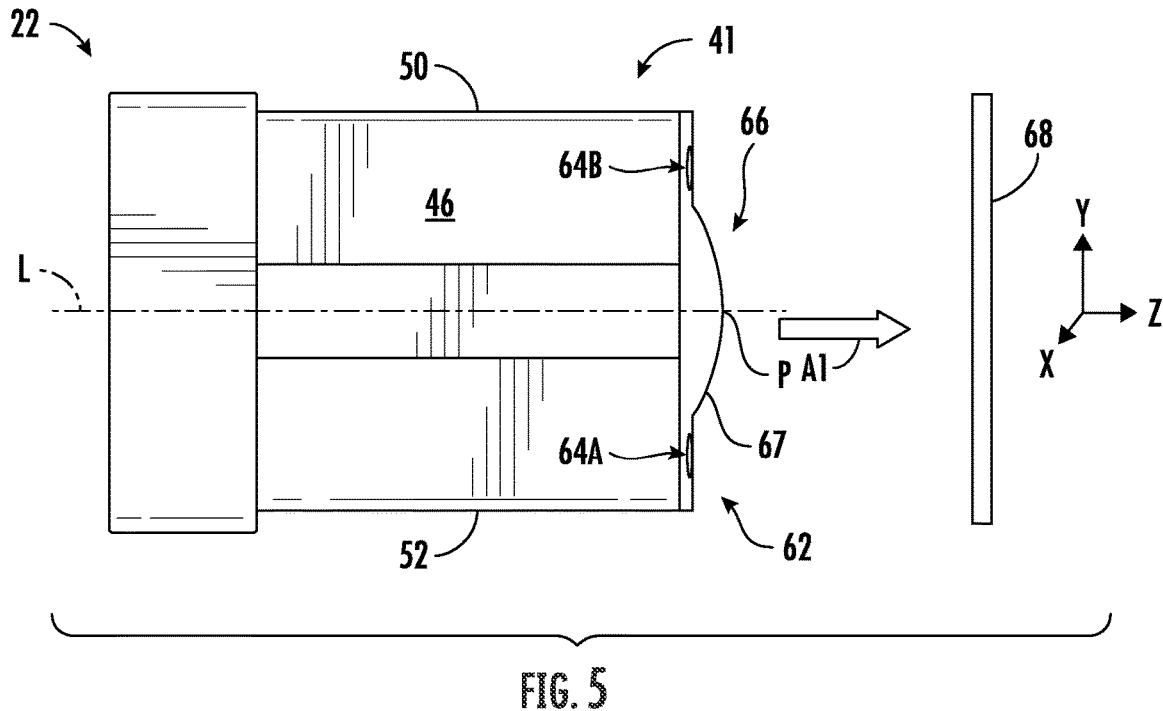
FIGS. 5-7 illustrate various steps of a method of treating the multi-fiber ferrule of FIG. 2 and of inserting optical fiber(s) into the ferrule.
Figure 6:
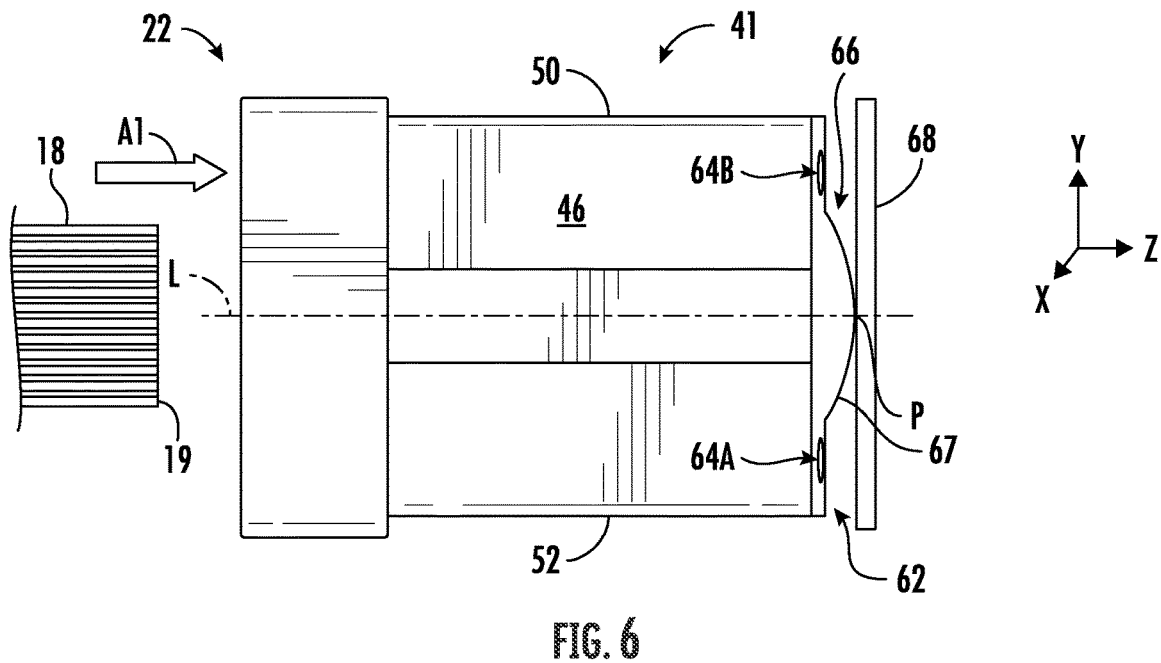
Figure 7:
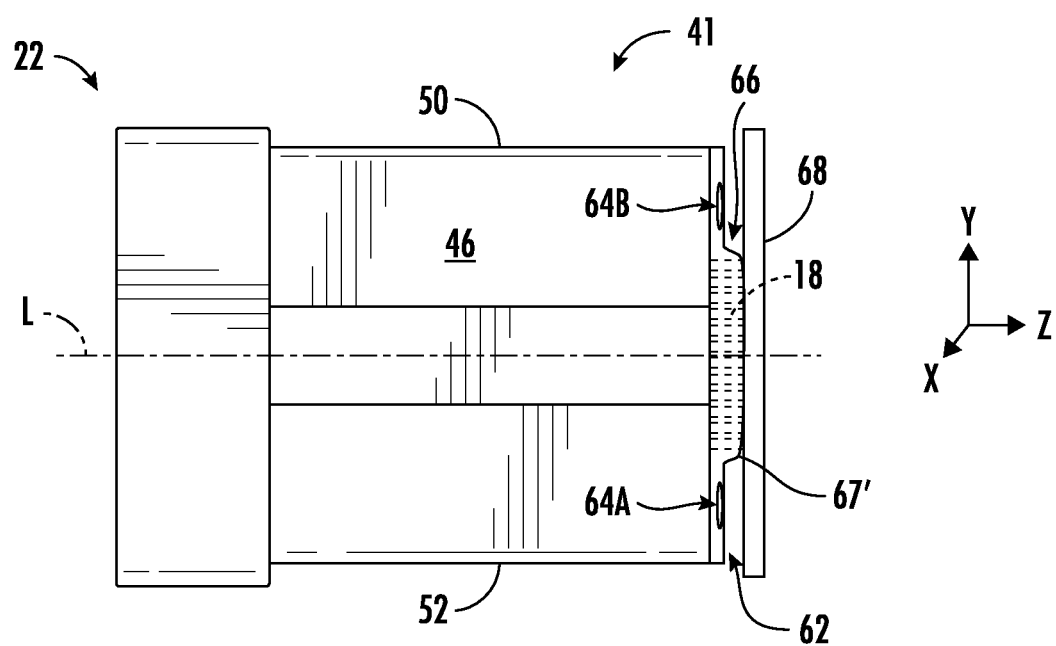

Referring now to FIGS. 5-7, a method of preparing fiber optic connector assembly 100 is shown. Referring first to FIG. 5, ferrule 22 is secured onto a stage (not shown) such that movement of ferrule 22 is only in the Z-direction based on the Cartesian coordinate system shown in FIGS. 5-7. Once mounted on the stage, ferrule 22 is heated such that microbores 60 and ferrule 22 expand. In some embodiments, ferrule 22 is heated by using direct laser energy, force air convection, conduction via direct contact with a heated highly conductive material (e.g., a copper or copper alloy), or other methods of applying heat energy to a known temperature based on the coefficient of thermal expansion of ferrule 22 and the amount of desired thermal growth in the Z-direction relative to where ferrule 22 is mounted on the stage. Ferrule 22 is moved along or pushed with a known force along direction A1 until protrusion 66 of ferrule 22 contacts contact target 68, which is configured to deform outer edge 67 of protrusion 66. In particular, contact target 68 is configured such that the center or max height of protrusion 66 (i.e., apex point P) is the point of contact between ferrule 22 and contact target 68. In some embodiments, contact target 68 has a flat shape. However, in some embodiments, contact target 68 may have a spherical shape, biparabolic shape, or cylindrical shape. It is within the scope of the present disclosure that in alternate embodiments, contact target 68 has other suitable shapes suitable for applications disclosed in the present disclosure. In some embodiments, contact target 68 has a material composition including at least one of: silica carbide, synthetic ruby, sapphire, or the like.

Referring now to FIG. 6, outer edge 67 of protrusion 66 is in contact with contact target 68 at the center or max height H of protrusion 66, and outer edge 67 deforms based on the force applied in direction A1 onto ferrule 22 resulting in a shape as shown in FIG. 7 (though alternate shapes are within the scope of the present disclosure). In some embodiments, deformation of protrusion 66 can be controlled as defined by Hertzian modeling and associated calculations based on various factors including the geometry of protrusion 66 and contact target 68, material composition of ferrule 22 and contact target 68, and the force applied in direction A1 onto ferrule 22. In controlling the deformation of outer edge 67 of protrusion 66, optical fiber protrusion height is controlled as discussed herein. In some embodiments, protrusion 66 deforms a percentage of protrusion height of protrusion 66. In some embodiments, protrusion 66 deforms about 1% of the original protrusion height of protrusion 66. As used herein, "protrusion height" refers to a distance from the ferrule end face from which the optical fiber 18 extends to the end face 19 of optical fiber 18.

While protrusion 66 is in contact with contact target 68, an optical fiber 18 or plurality of optical fibers 18 having respective end face(s) 19 are inserted into microbores 60 of ferrule 22 (along direction A1) until at least one of the end face(s) 19 of fiber(s) 18 is/are in contact with contact target 68 using a known applied force as described above with respect to the force applied onto ferrule 22. In some embodiments, optical fiber(s) 18 comprise a precision cleaved fiber array with pre-polished fiber end face(s) 19 that is/are fixtured with a known amount length extending from the fiber fixture to the end face(s) 19. By inserting optical fiber(s) in this configuration of protrusion 66, fiber protrusion height of optical fiber(s) 18 can be controlled relative to ferrule end face 62. In some embodiments, the ferrule length will contract relative to the optical fiber(s) resulting in well-controlled fiber protrusion relative to the ferrule end face 62. In some embodiments, after insertion of optical fiber(s) 18 within ferrule 22, optical fiber(s) 18 have a fiber protrusion height ranging between 0.5 microns and 20 microns relative to ferrule end face 62. In some embodiments, optical fiber(s) are cooled prior to insertion into ferrule 22 such that the clearance between microbores 60 and optical fiber(s) 18 is enhanced prior to and during insertion.

After optical fiber(s) 18 are inserted, the force applied in direction A1 is removed and elastic deformation between optical fiber(s) 18 and contact target 68 are relaxed. In addition, ferrule 22 is no longer heated and returns to ambient temperature whereby microbores 60 of ferrule 22 contract thereby creating an interference fit with optical fiber(s) 18 locking optical fiber(s) 18 in place within ferrule 22. That is, the length of ferrule 22 contracts relative to the position of optical fiber(s) 18 to create a well-controlled fiber protrusion relative to the ferrule end face 62.

In this case, the need for a bonding agent (e.g., epoxy or thermoplastic adhesive) may be reduced due to the interference fit between optical fiber(s) 18 and ferrule 22. However, in some embodiments, a bonding agent is provided within microbores 60 of ferrule 22. In particular, a bonding agent may be pre-loaded or stored within ferrule 22 (e.g., bonding agent may be pre-loaded into microbore 60 of ferrule 22 by the manufacturer of ferrule 22) for a significant amount of time (e.g., at least an hour, a day, a year, etc.) before inserting optical fiber 18 into microbore 60. In some embodiments, a bonding agent may be provided to the ferrule by alternative methods (e.g., injection during termination, etc.). Alternate methods of inserting the bonding agent within the ferrule are provided in U.S. patent application Ser. No. 17/867,766, filed on Jul. 19, 2022, such details are incorporated herein by reference.

U.S. Pat. No. 8,702,322 describes how the bonding agent may be a free-flowing powder material coupled within a ferrule bore via compression. The '322 patent also mentions that bonding agent may alternatively be extruded.

Although the discussion of possible bonding agents in the '322 patent have been incorporated herein by reference, additional details relating to such bonding agents can be found in U.S. Pat. No. 8,696,215 ("the '215 patent") and U.S. Pat. No. 9,568,686 ("the '686 patent"), such details also being incorporated herein by reference.

In some embodiments, in the assembled configuration of fiber optic connector assembly 100, optical fiber(s) 18 has a pre-thermal cycling fiber pull-out force of greater than 3 pounds force (lbf), greater than 5 lbf, or greater than 10 lbf as measured by methods known in the art. In some embodiments, optical fiber(s) 18 has a post-thermal cycling (aged) fiber-pull out force of greater than 2 lbf, greater than 3 lbf, or greater than 5 lbf as measured by methods known in the art and under thermal cycling conditions. As used herein, "thermal cycling" refers to temperature and humidity cycling in which an optical fiber connector assembly 100 is loaded into a thermal and humidity-controlled chamber and cycled according to the method disclosed in Telecordia standard GR-326, Issue 4, Sections 4.4.2.1 to 4.4.2.6.

In some embodiments, fiber optic connector assembly 100 has an insertion loss of less than 0.5 decibels (dB), or less than 0.35 dB at reference wavelengths between 850 nanometers (nm) and 1300 nm as measured by methods known in the art. In some embodiments, fiber optic connector assembly 100 has an insertion loss of less than 0.5 dB or less than 0.35 dB at reference wavelengths between 1310 nm to 1625 nm as measured by methods known in the art.

Protrusion 66 offers various benefits for fiber optic connector assembly 100 in terms of post assembly processing. In particular, protrusion 66 provides a feature to support optical fiber(s) 18 during post-cure fiber cleaving thus eliminating the need for an epoxy bead on ferrule end face 62. This provides the benefit of eliminating the need to remove epoxy from end face 62 of ferrule 22 during polishing and thereby reducing the amount of polishing time required. In addition, the amount of material of an end face 62 of ferrule 22 to be removed to build protrusion 66 during the polishing process is less when compared to a ferrule 22 with a flat end face 62. Stated another way, only the material encompassing protrusion 66 will need to be removed to expose fiber(s) 18 for fiber protrusion as opposed to material across the entire end face 62 for a ferrule 22 with a flat end face 62. Also, in some embodiments, protrusion 66 could be created using a two-material molding process thus further improving the performance of subsequent polishing or finishing processes. For example, the glass fill percentage in the protrusion area could be reduced to increase the rate of material removal thus decreasing the necessary polishing time. Finally, protrusion 66 offers a semi-isolated area of ferrule 22 through which the position of the ferrule microhole 60 with or without fiber(s) 18 installed may be modified to correct for ferrule molding errors. With or without the application of heat to increase ferrule material elasticity, pressure may be applied in key locations on ferrule end face 62 on or around protrusion 66 to modify the location of each microhole 60 or a group of microholes 60.

While the above disclosure regarding the method of assembling a connector 14 of fiber optic connector assembly 100 includes a ferrule 22 having a protrusion 66, it is within the scope of the present disclosure that the above method steps can be conducted with a ferrule 22 that does not include protrusion 66. In particular, in this embodiment, contact target 68 contacts ferrule end face 62 to control fiber protrusion as discussed above.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A multi-fiber optical ferrule assembly comprising:
   a ferrule body comprising a top surface, a bottom surface, a pair of opposing edge surfaces, a rear portion, and an end face;
      the ferrule body including a plurality of microholes configured to receive a plurality of optical fibers, wherein the plurality of microholes extend at least partially through the ferrule body to the end face;
      the end face including a protrusion extending from a surface of the end face, wherein the protrusion covers the plurality of microholes on the end face;
      wherein the protrusion has a maximum height ranging between 10 microns and 5000 microns from the surface of the end face to an outer edge of the protrusion; and
   wherein the multi-fiber optical ferrule assembly has an insertion loss of less than 0.5 decibels (dB) at a reference wavelength between 850 nanometers (nm) and 1300 nm.

2. The multi-fiber optical ferrule assembly of claim 1, wherein the protrusion has a shape of at least one of biparabolic, cylindrical, and chamfered shapes.

3. The multi-fiber optical ferrule assembly of claim 1, wherein the plurality of optical fibers are inserted through the ferrule body and into the protrusion, wherein each of the plurality of optical fibers includes an end face that resides at the outer edge of the protrusion.

4. The multi-fiber optical ferrule assembly of claim 3, wherein the plurality of optical fibers have a protrusion height ranging between 0.5 microns and 20 microns relative to the end face of the ferrule body.

5. The multi-fiber optical ferrule assembly of claim 1, wherein the protrusion is deformable when contacted by a contact target.

6. The multi-fiber optical ferrule assembly of claim 1, wherein the plurality of optical fibers are secured within the ferrule body by an interference fit such that the plurality of optical fiber withstand a pull-out force of at least 2 pounds-force (lbf).

7. The multi-fiber optical ferrule assembly of claim 1, wherein the multi-fiber optical ferrule assembly has an insertion loss of less than 0.35 dB at a reference wavelength between 1310 nm and 1625 nm.

8. A method of assembling an optical fiber assembly by terminating a plurality of optical fibers within a ferrule, wherein the ferrule comprises: a ferrule body comprising a top surface, a bottom surface, a pair of opposing edge surfaces, a rear portion, and an end face, the ferrule body including a plurality of microholes extending through the ferrule body from the rear portion to the end face and configured to receive a plurality of optical fibers, and the end face including a protrusion applied onto and extending from the end face, wherein the protrusion is applied over the plurality of microholes on the end face; the method comprising:
   heating the ferrule such that the plurality of microholes expand;
   moving the ferrule such that the protrusion contacts a contact target, wherein an outer edge of the protrusion deforms;
   inserting at least one optical fiber into at least one microhole of the plurality of microholes such that an end face of the at least one optical fiber is in contact with the contact target; and
   cooling the ferrule such that the plurality of microholes contract to create an interference fit and the length of the ferrule contracts relative to the position of the fiber to create well controlled fiber protrusion relative to the ferrule end face and at least one optical fiber of the plurality of optical fibers expand to create a fiber protrusion relative to the end face of the ferrule body.

9. The method of claim 8, wherein the fiber has a fiber protrusion height ranging between 0.5 microns and 20 microns from the end face of the ferrule body.

10. The method of claim 8, wherein the protrusion has a height ranging between 10 microns and 5000 microns from the end face to an outer edge of the protrusion.

11. The method of claim 8, wherein the protrusion has a shape of at least one of biparabolic, cylindrical, and chamfered shapes.

12. The method of claim 8, wherein the inserting step further comprises: inserting the plurality of optical fibers through the ferrule body and into the protrusion, wherein each end face of the plurality of optical fibers contact the outer edge of the protrusion.

13. The method of claim 8, wherein the plurality of optical fibers are secured within the ferrule body by an interference fit such that the plurality of optical fiber withstand a pull-out force of at least 2 pounds-force (lbf).

14. The method of claim 8, wherein the optical fiber assembly has an insertion loss of less than 0.5 decibels (dB) at a reference wavelength between 850 nanometers (nm) and 1300 nm.

15. The method of claim 8, wherein the optical fiber assembly has an insertion loss of less than 0.35 dB at a reference wavelength between 1310 nm and 1625 nm.

16. A multi-fiber optical ferrule assembly comprising:
    a ferrule body comprising a top surface, a bottom surface, a pair of opposing edge surfaces, a rear portion, and an end face;
        the ferrule body including a plurality of microholes configured to receive a plurality of optical fibers, wherein the plurality of microholes extend at least partially through the ferrule body to the end face;
        the end face including a protrusion extending from a surface of the end face, wherein the protrusion covers the plurality of microholes on the end face;
    wherein the protrusion has a maximum height ranging between 10 microns and 5000 microns from the surface of the end face to an outer edge of the protrusion;
    wherein the plurality of optical fibers are inserted through the ferrule body and into the protrusion, wherein each of the plurality of optical fibers includes an end face that resides at the outer edge of the protrusion;
    wherein the plurality of optical fibers have a protrusion height ranging between 0.5 microns and 20 microns relative to the end face of the ferrule body.

17. The multi-fiber optical ferrule assembly of claim 16, wherein the protrusion has a shape of at least one of biparabolic, cylindrical, and chamfered shapes.

18. The multi-fiber optical ferrule assembly of claim 16, wherein the protrusion is deformable when contacted by a contact target.

19. The multi-fiber optical ferrule assembly of claim 16, wherein the plurality of optical fibers are secured within the ferrule body by an interference fit such that the plurality of optical fiber withstand a pull-out force of at least 2 pounds-force (lbf).

20. The multi-fiber optical ferrule assembly of claim 16, wherein the multi-fiber optical fiber connector assembly has an insertion loss of less than 0.5 decibels (dB) at a reference wavelength between 850 nanometers (nm) and 1300 nm.

* * * * *